United States Patent
Wittmann

(10) Patent No.: US 10,415,184 B2
(45) Date of Patent: Sep. 17, 2019

(54) METHOD FOR OBTAINING STABILIZED LIGNIN HAVING A DEFINED PARTICLE-SIZE DISTRIBUTION FROM A LIGNIN-CONTAINING LIQUID

(71) Applicant: SUNCOAL INDUSTRIES GMBH, Ludwigsfelde (DE)

(72) Inventor: Tobias Wittmann, Berlin (DE)

(73) Assignee: SUNCOAL INDUSTRIES GMBH, Ludwigsfelde (DE)

( * ) Notice: Subject to any disclaimer, the term of this patent is extended or adjusted under 35 U.S.C. 154(b) by 71 days.

(21) Appl. No.: 15/502,658

(22) PCT Filed: Aug. 4, 2015

(86) PCT No.: PCT/EP2015/067958
§ 371 (c)(1),
(2) Date: Feb. 8, 2017

(87) PCT Pub. No.: WO2016/020383
PCT Pub. Date: Feb. 11, 2016

(65) Prior Publication Data
US 2017/0247255 A1  Aug. 31, 2017

(30) Foreign Application Priority Data
Aug. 8, 2014  (DE) .................... 10 2014 215 807

(51) Int. Cl.
| | | |
|---|---|---|
| *C01B 31/02* | (2006.01) | |
| *D21C 11/00* | (2006.01) | |
| *D21C 3/02* | (2006.01) | |
| *D21H 11/02* | (2006.01) | |
| *C08L 97/00* | (2006.01) | |
| *C08H 7/00* | (2011.01) | |
| *C01B 32/05* | (2017.01) | |

(52) U.S. Cl.
CPC .......... *D21C 11/0007* (2013.01); *C01B 32/05* (2017.08); *C08H 6/00* (2013.01); *C08L 97/005* (2013.01); *D21C 3/02* (2013.01); *D21C 11/00* (2013.01); *D21H 11/02* (2013.01); *C01P 2002/60* (2013.01); *C01P 2004/61* (2013.01)

(58) Field of Classification Search
CPC .................................................. C01B 32/05
See application file for complete search history.

(56) References Cited

U.S. PATENT DOCUMENTS

| 8,492,600 B2 * | 7/2013 | Marker ..................... C01B 3/16 |
| | | 201/21 |
| 9,828,726 B2 * | 11/2017 | Hiljanen .................. C07G 1/00 |
| 2012/0103040 A1 | 5/2012 | Wolf et al. |
| 2013/0116383 A1 | 5/2013 | Naskar et al. |
| 2016/0200754 A1 | 7/2016 | Wittmann et al. |

FOREIGN PATENT DOCUMENTS

| CA | 903194 A | 6/1972 |
| CH | 318820 A | 1/1957 |
| GB | 729220 A | 5/1955 |
| JP | 2011178851 A | 9/2011 |
| WO | 2009/104995 A1 | 8/2009 |
| WO | 2010/112230 A1 | 10/2010 |
| WO | 2010/143997 A1 | 12/2010 |
| WO | 2012/091906 A2 | 7/2012 |
| WO | 2012/117161 A1 | 9/2012 |
| WO | 2012177198 A1 | 12/2012 |
| WO | 2013/002687 A1 | 1/2013 |
| WO | 2013070130 A1 | 5/2013 |
| WO | 2013112100 A1 | 8/2013 |
| WO | 2014096544 A1 | 6/2014 |
| WO | 2015018944 A1 | 2/2015 |
| WO | 2015025076 A1 | 2/2015 |

OTHER PUBLICATIONS

Kang et al., "Characterization of Hydrochars Produced by Hydrothermal Carbonization of Lignin, Cellulose, o-Xylose, and Wood Meal", Industrial & Engineering Chemistry Research, vol. 51, Issue 26, Jun. 2012, pp. 9023-9031.

* cited by examiner

*Primary Examiner* — Stuart L Hendrickson
(74) *Attorney, Agent, or Firm* — Maschoff Brennan

(57) ABSTRACT

A process for recovering carbonized lignin having a defined grain size distribution from a lignin-containing liquid is provided. The lignin-containing liquid is subjected to a hydrothermal carbonization to convert the lignin into a carbonized lignin and the carbonized lignin is separated from the liquid containing the carbonized lignin. The lignin-containing liquid is subjected to a hydrothermal carbonization at temperatures in the range from about 150° C. to about 280° C. and by adapting the H+ ion concentration in the lignin-containing liquid before and/or during the hydrothermal carbonization the grain size distribution of the carbonized lignin is adjusted.

23 Claims, 9 Drawing Sheets

METHOD FOR OBTAINING STABILIZED LIGNIN HAVING A DEFINED PARTICLE-SIZE DISTRIBUTION FROM A LIGNIN-CONTAINING LIQUID

CROSS-REFERENCE TO A RELATED APPLICATION

This application is a National Phase Patent Application of International Patent Application Number PCT/EP2015/067958, filed on Aug. 4, 2015, which claims priority of German Patent Application Number 10 2014 215 807.9, filed on Aug. 8, 2014.

BACKGROUND

The invention relates to a process for recovering a stabilized lignin having a defined grain size distribution from a lignin-containing liquid where before and/or during a hydrothermal carbonization the H+ ion concentration of a lignin-containing liquid is adjusted such that the desired grain size distribution of the hydrothermally carbonized lignin is obtained and said lignin may be separated from the liquid containing the carbonized lignin and optionally purified.

Definitions

Lignin-Containing Liquid
  Lignin-containing liquid is hereinbelow to be understood as meaning a liquid, preferably water, comprising lignin, wherein the lignin may be present either in dissolved form and/or as a filterable solid. The lignin-containing liquid is preferably waste liquor from a fractionation process for biomass, for example from a KRAFT process or a potassium hydroxide process. When the lignin-containing liquid is waste liquor from a fractionation process the pH of the lignin-containing liquid is generally in the neutral or alkaline range, generally at a pH of >7.
  It is furthermore preferable when the lignin-containing liquid is a liquid comprising the lignin-containing residue from a hydrolysis, for example a thermal hydrolysis, an enzymatic hydrolysis or an acid-catalyzed hydrolysis, wherein the lignin-containing residue from the hydrolysis is preferably initially dewatered and the thus-obtained filtercake or the thus-obtained concentrate is subsequently mixed with a liquid and together with said liquid forms the lignin-containing liquid which is supplied to the process according to the invention. When the lignin-containing liquid is the lignin-containing residue from a hydrolysis, the pH, when the lignin-containing residue is mixed with distilled water after a dewatering, is generally in the neutral or acidic range, generally at a pH of <7.
  The lignin-containing liquid may comprise further organic and inorganic constituents as well as lignin. It is characteristic of the lignin-containing liquid that the lignin proportion in the organic dry matter is greater than 50%, in particular greater than 60%, or even greater than 70%, and thus markedly greater than the lignin proportion of woody biomass which is 15%-35%. Lignin proportion is hereinbelow to be understood as meaning the sum of Klason lignin and acid-soluble lignin. Accordingly, reported amounts and percentages for lignin hereinbelow always relate to the ash-free dry matter.

Stabilized Lignin
  Lignin that has been subjected to a hydrothermal carbonization by the process according to the invention at a temperature in a range from about 150° C. to about 280° C., for example in a temperature range between 180° C. and 280° C., in particular a temperature range between 180° C. and 250° C. and in particular a temperature range between 190° C. and 250° C., is hereinbelow referred to as stabilized lignin. The stabilized lignin is also referred to as carbonized lignin.

Carbonized-Lignin-Containing Liquid
  Liquid which comprises the carbonized lignin after the hydrothermal carbonization, wherein the carbonized lignin may be present in the liquid either in dissolved form and/or as a filterable solid, is hereinbelow referred to as carbonized-lignin-containing liquid.

Dissolved Lignin/Dissolved Carbonized Lignin
  Lignin is hereinbelow referred to as lignin dissolved in the lignin-containing liquid or as carbonized lignin dissolved in the liquid containing the carbonized lignin when it cannot be separated from the lignin-containing liquid or the carbonized lignin-containing liquid by a filtration using a filter paper having a pore size of <10 µm.

Undissolved Lignin/Undissolved Carbonized Lignin
  Lignin is hereinbelow referred to as lignin undissolved in the lignin-containing liquid or as carbonized lignin undissolved in the liquid containing the carbonized lignin when it can be separated from the lignin-containing liquid or the carbonized lignin-containing liquid by a filtration using a filter paper having a pore size of <10 µm.

Precipitation of Dissolved Lignin/Precipitation of Dissolved Carbonized Lignin
  Precipitation is hereinbelow to be understood as meaning a predominant conversion of more than 40%, preferably of more than 50%, more preferably of more than 60%, particularly preferably of more than 70%, of dissolved lignin/dissolved carbonized lignin into undissolved lignin/undissolved carbonized lignin.

Dry Matter:
  Dry matter is the evaporation residue of a liquid obtained upon evaporation to constant weight under atmospheric pressure at 105° C.

Organic Dry Matter:
  Organic dry matter is dry matter minus the ash remaining on ashing to constant weight at 815° C.

Grain Size Distribution
  Grain size distribution is hereinbelow to be understood as meaning the Q3 distribution. Measurement of the grain size distribution of the lignin or of the carbonized lignin is effected in a suspension by laser diffraction without previous drying of the lignin or of the carbonized lignin. Before and/or during measurement of the grain size distribution the sample to be measured is dispersed with ultrasound until a grain size distribution stable over a plurality of measurements is obtained.

Colloidal Carbonized Lignin
  Colloidal carbonized lignin is hereinbelow to be understood as meaning a suspension of carbonized lignin in a liquid, wherein at a dry matter proportion of >1% the carbonized lignin does not form a sediment in the liquid but rather is homogeneously distributed therein. Homogeneous distribution of the carbonized lignin in the liquid is achieved by a cancellingly strong polarity of the carbonized lignin particles. The D90 of the particle size distribution of the carbonized colloidal lignin is generally less than 60 µm and the D50 is generally less than 20 μm. With sufficient dispersal with ultrasound the D90 of the particle size distribution of the carbonized colloidal lignin is generally less than 30 μm and the D50 is generally less than 10 μm. The grain size distribution of the colloidal carbonized lignin is generally unimodal.

Sediment of Carbonized Lignin

A sediment of carbonized lignin is formed when the polarity and/or the particle size distribution of the carbonized lignin is such that at least 90% of the carbonized lignin form a sediment layer within not more than 5 minutes under the action of gravity.

Fine sediment of carbonized lignin is hereinbelow to be understood as meaning that the D90 of the particle size distribution is less than 1000 μm. In one exemplary embodiment the D90 of the particle size distribution is less than 100 μm, in particular less than 50 μm. The grain size distribution of a fine sediment of carbonized lignin may be comparable with that of a colloidal carbonized lignin. The difference between a colloidal carbonized lignin and a fine sediment of carbonized lignin is that in contrast to colloidal carbonized lignin at a solids proportion of >1 at least 90% of the fine sediment of carbonized lignin forms a sediment layer under the action of gravity within not more than 5 minutes.

Coarse sediment is hereinbelow to be understood as meaning that the D90 of the particle size distribution is more than 1000 μm.

DESCRIPTION

Lignin is generated as a byproduct of fractionation processes of woody biomass. During the fractionation processes the lignin is typically either brought into solution and then separated from the insoluble constituents of the woody biomass (for example KRAFT process) or the woody biomass is depolymerized such that the lignin predominantly remains in the form of a solid (for example hydrolysis process). The lignin is accordingly present either dissolved in a liquid or as a solid depending on the type of fractionation process.

According to the prior art, lignin dissolved in a lignin-containing liquid may be precipitated by increasing the H+ ion concentration. It is moreover known that the grain size distribution of the precipitated lignin may be influenced by management of this precipitation process, in particular by specifically adapting pH, ion strength and residence time (WO 2012/177198 A1, WO 2013/070130A1). According to the prior art lignin obtained by precipitation from a dissolved-lignin-containing liquid exhibits thermoplastic behavior (US 2013/0116383 A1). A substantial disadvantage of such a product is that it undergoes plastic deformation upon heating and is thus not temperature stable. The application of such a lignin is thus limited to applications in which temperatures of 80° C. are generally not exceeded.

According to the prior art efforts are being made to overcome the thermoplastic property of lignin through stabilization by heating under inert conditions for example utilizing nitrogen, helium, neon, argon, krypton or xenon (WO 2013/112100 A1). A substantial disadvantage of such a process is the focus on carbon fiber applications and the high cost of the stabilization.

It is also known that lignin may be processed into a substitute for plastics by hydrothermal carbonization at temperatures above 300° C. (JP 2011-178851 A). A substantial disadvantage of such a process is the high process temperature. It is furthermore not clear whether and how particle size distribution may be influenced in such a variant of hydrothermal carbonization. It is furthermore unclear whether the lignin treated by the process described in printed publication JP 2011-178851 A has lost its thermoplastic behavior.

SUMMARY

The problem addressed by the present invention was that of overcoming the disadvantages of the prior art in the utilization of lignin and improving the recovery of lignin having a defined grain size distribution.

The object is achieved by a process according to the invention for recovering stabilized lignin having a defined grain size distribution from a lignin-containing liquid in which the lignin-containing liquid is subjected to a hydrothermal carbonization at temperatures in a range from about 150° C. to about 280° C., preferably in a range of 200° C. and 250° C., to convert the lignin into a carbonized lignin, the grain size distribution of the carbonized lignin is adjusted by adapting the H+ ion concentration in the lignin-containing liquid before and/or during the hydrothermal carbonization and the carbonized lignin is separated from the liquid containing the carbonized lignin.

Accordingly, in the context of a process according to the invention stabilized lignin is recovered from a lignin-containing liquid, the grain size distribution of the stabilized lignin is adjusted and the stabilized lignin is separated from the liquid containing the stabilized lignin. The stabilized lignin is optionally also purified.

A process according to the invention makes it possible to recover stabilized lignin having a defined grain size distribution. The separation of lignin from the lignin-containing liquid is markedly simplified here compared to the prior art. The grain size distribution and the polarity of the stabilized lignin are for example adjusted such that the stabilized lignin may be separated from the liquid containing the stabilized lignin by filtration or decantation. Besides, the purification of the lignin of inorganic constituents may also be simplified compared to the prior art based on the process according to the invention.

According to the prior art an acid exerts a catalytic effect on a hydrothermal carbonization of biomass. According to the prior art a hydrothermal carbonization of biomass furthermore releases acid mainly in the form acetic acid, formic acid and levulinic acid. A hydrothermal carbonization of biomass therefore also proceeds autocatalytically. According to the prior art in a hydrothermal carbonization of lignin mainly just a few phenol compounds are dissolved out of said lignin while the solid is predominantly preserved as such.

It was found by experiment that, surprisingly, lignin undergoes polymerization with consumption of H+ ions during a hydrothermal carbonization. When few H+ ions are present in the lignin-containing liquid the polymerization of the lignin may be retarded or completely inhibited. When many H+ ions are present in the lignin-containing liquid a polymerization takes place. The solution provided by the present invention takes advantage of this.

One exemplary embodiment of a process according to the invention thus differs from the known prior art, in which acids are used as catalysts to reduce the reaction temperature of a hydrothermal carbonization for example, in that in the process according to the invention acid is used merely to increase the H+ ion concentration, the H+ ions facilitating the polymerization of the lignin in the hydrothermal carbonization and thus being consumed. The acid is accordingly not used as a catalyst but rather is a reaction participant. This can be determined for example by the finding that when an H+ ion concentration in the lignin-containing liquid which favors a polymerization of the lignin is adjusted before the hydrothermal carbonization, the H+ ion concentration after the hydrothermal carbonization has been reduced, the H+ ions thus having been consumed.

It may likewise be provided, in contrast to the prior art, that a base is utilized to reduce the H+ ion concentration, the absent H+ ions inhibiting the polymerisation of the lignin. The base is accordingly utilized not as a catalyst but for binding H+ ions. This can be determined for example by the finding that when an H+ ion concentration in the lignin-containing liquid which inhibits a polymerization of the lignin is adjusted before the hydrothermal carbonization, the H+ ion concentration after the hydrothermal carbonization has not substantially changed. If the smallest possible grain size distribution of the carbonized lignin is to be achieved the polymerization of the lignin must be retarded/inhibited. A low H+ ion concentration must accordingly be adjusted. If the largest possible grain size distribution of the carbonized lignin is to be achieved, polymerization of the lignin must be facilitated. A high H+ ion concentration must accordingly be adjusted.

One difference between the process according to the invention and the prior art which comprises adjusting the grain size distribution of lignin in a precipitation process by adapting for example pH, residence time and ion strength is that the grain size distribution of the carbonized lignin is not achieved by adjustment of the grain size distribution of the lignin in a precipitation process before the hydrothermal carbonization but rather the H+ ion concentration before and/or during the hydrothermal carbonization is utilized for adjustment of the grain size distribution of the carbonized lignin. The process according to the invention accordingly either changes or maintains the grain size distribution of the carbonized lignin as required compared to the grain size distribution of a lignin precipitated according to the prior art. Accordingly, the grain size distribution of a lignin precipitated according to the prior art may also be deliberately maintained during its conversion into carbonized lignin by application of the process according to the invention.

It is preferable when the duration of the hydrothermal carbonization is not less than one hour and not more than 6 hours; it is particularly preferable when the duration is not less than 2 hours and not more than 4 hours. In one variant the duration of the hydrothermal carbonization is about 3 hours.

In one embodiment the duration of the hydrothermal carbonization is chosen such that a carbonized lignin having the desired grain size distribution may be separated from the carbonized lignin-containing liquid. In such a process regime the duration of the hydrothermal carbonization may also be less than one hour.

As already described above, acids for example are utilized for increasing the H+ ion concentration, and bases for reducing the H+ ion concentration, in the lignin-containing liquid. Gases which undergo acidic or basic reaction with the lignin-containing liquid, preferably $CO_2$ or $H_2S$, may also be utilized for adapting the H+ ion concentration for example.

When not only lignin but also other organic polymers, for example biomass, such as wood, straw, grass, etc., cellulose, hemicellulose and/or decomposition products thereof, for example glucose etc., are present in the lignin-containing liquid, these organic polymers and the degradation products thereof form organic acids during the hydrothermal carbonization which increase the H+ ion concentration in the lignin-containing liquid. In this connection it may be provided that in one embodiment the increase in the H+ ion concentration in the liquid containing the lignin which takes place due to the formation of organic acids during the hydrothermal carbonization is taken into account in the adjustment of the H+ ion concentration before and/or during the hydrothermal carbonization. Alternatively or in addition, the H+ ion concentration may be increased during the hydrothermal carbonization by increasing the proportion of biomass, such as wood, straw, grass, cellulose, hemicellulose and/or the degradation products thereof, in the lignin-containing liquid before and/or during the hydrothermal carbonization.

In one embodiment the grain size distribution of the carbonized lignin is measured continuously or at regular intervals and in the case of a deviation of the grain size distribution in excess of a defined tolerance an adaptation of the H+ ion concentration in the lignin-containing liquid is undertaken. Thus for example when a reduction in the grain size distribution of the carbonized lignin is required the H+ ion concentration in the lignin-containing liquid is reduced before and/or during the hydrothermal carbonization and when an increase in the grain size distribution of the carbonized lignin is required the H+ ion concentration in the lignin-containing liquid is increased before and/or during the hydrothermal carbonization.

In one variant the H+ ion concentration of the liquid containing the carbonized lignin is measured and utilized as a measure of the grain size distribution after the hydrothermal carbonization. It is preferable when the H+ ion concentration of the liquid containing the carbonized lignin is adjusted after the hydrothermal carbonization so that the grain size of the carbonized lignin is adjusted by adapting the H+ ion concentration in the lignin-containing liquid before and/or during the hydrothermal carbonization.

The pH may be used as a measure of the H+ ion concentration in the lignin-containing liquid. Accordingly, in one variant the grain size distribution of the carbonized lignin may be adjusted by adapting the pH of the lignin-containing liquid before and/or during the hydrothermal carbonization. It is preferable when the pH of the liquid containing the carbonized lignin is adjusted after the hydrothermal carbonization and the grain size of the carbonized lignin is thus adjusted by adapting the pH of the lignin-containing liquid before and/or during the hydrothermal carbonization.

The above-recited variants of a process according to the invention may also be combined with one another.

BRIEF DESCRIPTION OF THE DRAWINGS

Example embodiments will be described and explained with additional specificity and detail through the use of the accompanying drawings in which.

Possible Embodiments for Input Materials

Figure 1:
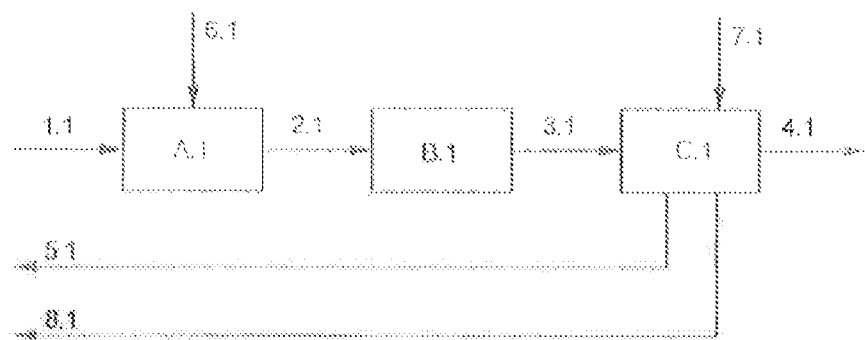
FIG. 1 illustrates an exemplary embodiment for recovering a stabilized lignin having a defined particle size distribution applied to black liquor.

Disclosed exemplarily hereinbelow are possible embodiments of the process according to the invention, each of which may be combined with the above-recited variants.

One embodiment of the process according to the invention is for example characterized in that
lignin is precipitated from the lignin-containing liquid,
the lignin-containing liquid is subjected to a hydrothermal carbonization at temperatures in a range from about 150° C. to about 280° C., preferably in a range from 200° C. to 250° C., to convert the lignin into a carbonized lignin,
the grain size distribution of the carbonized lignin is adjusted by adapting the H+ ion concentration in the lignin-containing liquid before and/or during the hydrothermal carbonization and
the carbonized lignin is separated from the liquid containing the carbonized lignin.

In this embodiment of the process according to the invention the lignin which is initially present in dissolved form in the lignin-containing liquid is precipitated and then supplied to the hydrothermal carbonization. The lignin-containing liquid is for example waste liquor from a basic fractionation process, for example a KRAFT digestion. This embodiment of the process according to the invention thus includes a precipitation step before the hydrothermal carbonization in which the pH of the lignin-containing liquid is reduced to an extent such that the lignin precipitates out of said liquid, preferably to a value between 9.5 and 10.5. Acids or gases which undergo acidic reaction with the lignin-containing liquid may be employed to reduce the pH. It is preferable when $CO_2$ is used for reducing the pH. This embodiment of the process according to the invention preferably affords a colloidal lignin or a fine sediment of carbonized lignin.

A further embodiment of the process according to the invention is for example characterized in that
lignin is precipitated from a first lignin-containing liquid,
the precipitated lignin is separated from the first lignin-containing liquid.
the precipitated and separated lignin is suspended in a liquid to obtain a second lignin-containing liquid, wherein in one development the precipitated and separated lignin may also be at least partly or fully dissolved in the liquid,
the second lignin-containing liquid is subjected to a hydrothermal carbonization at temperatures in a range from about 150° C. to about 280° C., preferably between 200° C. and 250° C., to convert the lignin into a carbonized lignin,
the grain size distribution of the carbonized lignin is adjusted by adapting the H+ ion concentration in the lignin-containing liquid before and/or during the hydrothermal carbonization and
the carbonized lignin is separated from the liquid containing the carbonized lignin.

In this embodiment of the process according to the invention the lignin which is initially present in dissolved form in a first lignin-containing liquid is precipitated and then largely separated from this first lignin-containing liquid. The precipitated lignin largely separated from the first lignin-containing liquid is suspended in a liquid and optionally dissolved to obtain a second lignin-containing liquid which is then supplied to the hydrothermal carbonization. The first lignin-containing liquid is for example waste liquor from a basic fractionation process, for example a KRAFT digestion. This embodiment of the process according to the invention thus includes a precipitation step and a separation step before the hydrothermal carbonization.

In the precipitation step the pH of the lignin-containing liquid is reduced an extent such that the lignin precipitates therefrom, preferably to a value between 9.5 and 10.5. Acids or gases which undergo acidic reaction with the lignin-containing liquid may be employed to reduce the pH. It is preferable when $CO_2$ is used for reducing the pH.

In a separation step the first lignin-containing liquid is separated as far as possible and necessary from the precipitated lignin. The separation step preferably employs a filter press, a membrane filter press or a decanter. It is preferable when inorganic impurities too are removed from the lignin with the lignin-containing liquid during the separation step. The lignin-containing liquid has a markedly reduced lignin proportion once the precipitated lignin has been separated therefrom. This preferred embodiment of the process according to the invention preferably affords a fine sediment of carbonized lignin.

Another embodiment of the process according to the invention is for example characterized in that
the lignin is present dissolved in the lignin-containing liquid,
the lignin-containing liquid is subjected to a hydrothermal carbonization at temperatures in a range from about 150° C. to about 280° C., preferably in a range from 200° C. to 250° C., to convert the lignin into a carbonized lignin,
lignin precipitates or is precipitated from the lignin-containing liquid at least partly upon conversion into carbonized lignin during the hydrothermal carbonization,
the grain size distribution of the carbonized lignin is adjusted by adapting the H+ ion concentration in the lignin-containing liquid before or during the hydrothermal carbonization,
the carbonized lignin is separated from the liquid containing the carbonized lignin.

In this embodiment of the process according to the invention the lignin is present dissolved in the lignin-containing liquid before the hydrothermal carbonization. The lignin-containing liquid is for example waste liquor from a basic fractionation process, for example a KRAFT digestion. Lignin not dissolved in the lignin-containing liquid may initially be brought into solution by increasing the pH and then supplied to the hydrothermal carbonization as dissolved lignin. In this embodiment the dissolved lignin is at least partly precipitated during the hydrothermal carbonization. A further precipitation of the carbonized lignin still dissolved in the liquid containing the carbonized lignin may be effected after the hydrothermal carbonization. This embodiment of the process according to the invention preferably affords a colloidal lignin or a fine sediment of carbonized lignin.

Possible Embodiments for Products

Exemplarily disclosed hereinbelow are three alternative embodiments of the process according to the invention.

Thus, there may be provided a process for recovering carbonized lignin having a defined grain size distribution from a lignin-containing liquid in which the lignin-containing liquid is subjected to a hydrothermal carbonization at temperatures in a range from about 150° C. to about 280° C., preferably in a range from 200° C. to 250° C., to convert the lignin into a carbonized lignin, by adapting the H+ ion concentration in the lignin-containing liquid before and/or during the hydrothermal carbonization the grain size distribution of the carbonized lignin is adjusted such that a colloidal carbonized lignin is formed, wherein the pH of the lignin-containing liquid does not fall below 10 before and during the hydrothermal carbonization and the carbonized lignin is separated from the liquid containing the carbonized lignin.

In this embodiment adjustment of the H+ ion concentration in the lignin-containing liquid results in formation of a colloidal carbonized lignin. To this end, before and during hydrothermal carbonization an H+ ion concentration corresponding to a pH of >=10 is provided. As a result of this adjustment of the H+ ion concentration a polymerization of the lignin during the hydrothermal carbonization is inhibited. A further result is that the particle size distribution and the functional groups of the carbonized lignin are arranged such that a colloidal carbonized lignin is formed. It is preferable when the carbonized colloidal lignin is separated from the liquid containing the carbonized colloidal lignin by a filtration at a temperature of preferably at least 60° C.

In a further variant a process is provided in which the lignin-containing liquid is subjected to a hydrothermal carbonization at temperatures in a range from about 150° C. to about 280° C., preferably in a range from 200° C. to 250° C., to convert the lignin into a carbonized lignin, by adapting the H+ ion concentration in the lignin-containing liquid before and/or during the hydrothermal carbonization the grain size distribution of the carbonized lignin is adjusted such that a fine sediment of carbonized lignin is formed and the carbonized lignin is separated from the liquid containing the carbonized lignin.

It is preferable here when the pH of the lignin-containing liquid before the hydrothermal carbonization is >7, particularly preferably >8, and during the hydrothermal carbonization is between 7 and 11, particularly preferably between 8 and 10.

In this embodiment adjustment of the H+ ion concentration in the lignin-containing liquid results in formation of a fine sediment of carbonized lignin. To this end it is preferable to provide before the hydrothermal carbonization an H+ ion concentration corresponding to a pH of >7. It is preferable to provide during the hydrothermal carbonization an H+ ion concentration corresponding to a pH between 7 and 11. As a result of this adjustment of the H+ ion concentration the formation of coarse particles by a polymerization of the lignin during the hydrothermal carbonization is largely inhibited. A further result is that the particle size distribution and the functional groups of the carbonized lignin are arranged such that a fine sediment of carbonized lignin is formed.

In a further variant there is provided a process for recovering carbonized lignin having a defined grain size distribution from a lignin-containing liquid in which the lignin-containing liquid is subjected to a hydrothermal carbonization at temperatures in a range from about 150° C. to about 280° C., preferably in a ranges from 200° C. to 250° C., to convert the lignin into a carbonized lignin, by adapting the H+ ion concentration in the lignin-containing liquid before and/or during the hydrothermal carbonization the grain size distribution of the carbonized lignin is adjusted such that a coarse sediment of carbonized lignin is formed and the carbonized lignin is separated from the liquid containing the carbonized lignin.

It is preferable here when the pH of the lignin-containing liquid before the hydrothermal carbonization is <9, particularly preferably <8, and during the hydrothermal carbonization is <8.

In this embodiment adjustment of the H+ ion concentration in the lignin-containing liquid results in formation of a coarse sediment of carbonized lignin. To this end it is preferable to provide before the hydrothermal carbonization an H+ ion concentration corresponding to a pH of <9. It is preferable to provide during the hydrothermal carbonization an H+ ion concentration corresponding to a pH of <8. As a result of this adjustment of the H+ ion concentration the formation of coarse particles by a polymerization of the lignin during the hydrothermal carbonization is promoted. A further result is that the particle size distribution and the functional groups of the carbonized lignin are arranged such that a coarse sediment of carbonized lignin is formed.

DETAILED DESCRIPTION

Elucidated hereinbelow are further exemplary embodiments which are additionally more particularly visualized in the accompanying FIGS. 1 to 4.

Exemplary Embodiment 1 (FIG. 1):

In exemplary embodiment 1 a process according to the invention for recovering a stabilized lignin having a defined particle size distribution is applied to black liquor from an alkaline fractionation process according to the KRAFT process. The process produces a fine sediment of carbonized lignin. The exemplary embodiment is illustrated in FIG. 1.

The black liquor (1.1) is withdrawn from the evaporation plant of the KRAFT process having a dry matter content of about 30 mass % and represents the lignin-containing liquid. The pH of the black liquor is about 13. The lignin is dissolved in the black liquor. The pH of the black liquor is initially reduced to about 10.5 by introduction of $CO_2$ (6.1) in an apparatus for pH reduction (A.1). The thus-pretreated black liquor (2.1) is hydrothermally carbonized over a duration of 3 hours and at a temperature of 250° C. in a hydrothermal carbonization (B.1). Carbonized lignin precipitates from the black liquor during the hydrothermal carbonization. Due to the process regime lignin may also precipitate from the black liquor before the hydrothermal carbonization in the apparatus for pH reduction (A.1). However, the predominant portion precipitates during the hydrothermal carbonization. The pH of the carbonized black liquor (3.1) is about 9.5 after the hydrothermal carbonization. The carbonized, precipitated lignin is separated from the carbonized black liquor through a mechanical dewatering (C.1) in a filter press to obtain a filtercake. The thus-obtained filtrate (5.1) is recycled into the evaporation plant of the KRAFT process. The filtercake is then washed with water (7.1). The washing water is recycled into the evaporation plant of the KRAFT process after the wash (8.1). The washed filtercake (4.1) consists of a fine sediment of carbonized lignin and remaining water and is discharged from the process.

Figure 5:
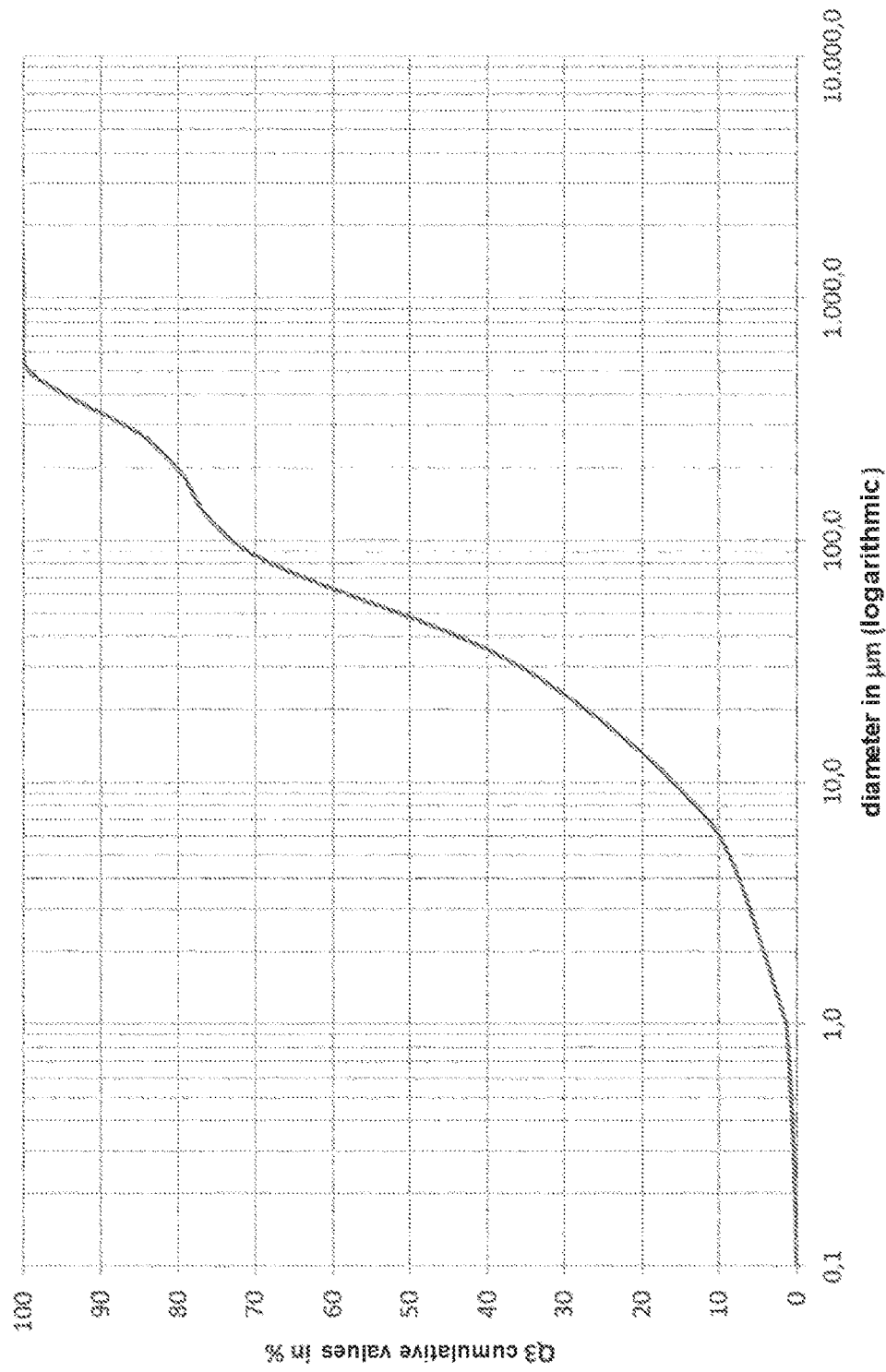
FIGS. 5-10 are graphs showing diameter of grain or particle size versus cumulative values by percent.

To determine the Q3 distribution of the grain size of the fine sediment of carbonized lignin the filtercake (4.1) diluted with distilled water was dispersed using ultrasound over a duration of 120 seconds and subjected to laser diffraction measurement with a Cilas 1190 laser granulometer instrument. The thus-determined grain size distribution of the fine sediment of carbonized lignin is depicted in FIG. 5 which shows the Q3 distribution of the carbonized lignin for exemplary embodiment 1. The D90 is 334.87 μm and the D50 is 47.93 μm.

Figure 2:
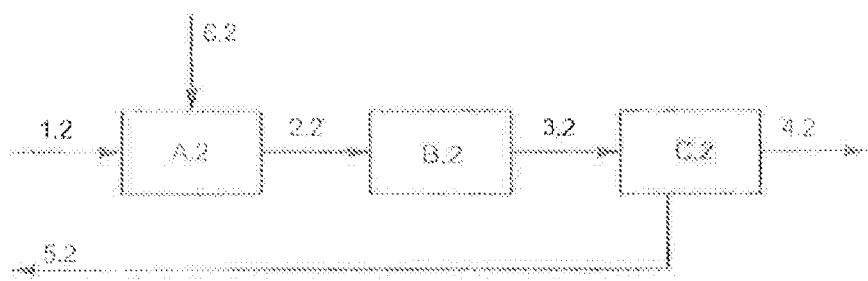
FIG. 2 illustrates an exemplary embodiment for recovering a stabilized lignin having a defined particle size distribution applied to black liquor.
Figure 3:
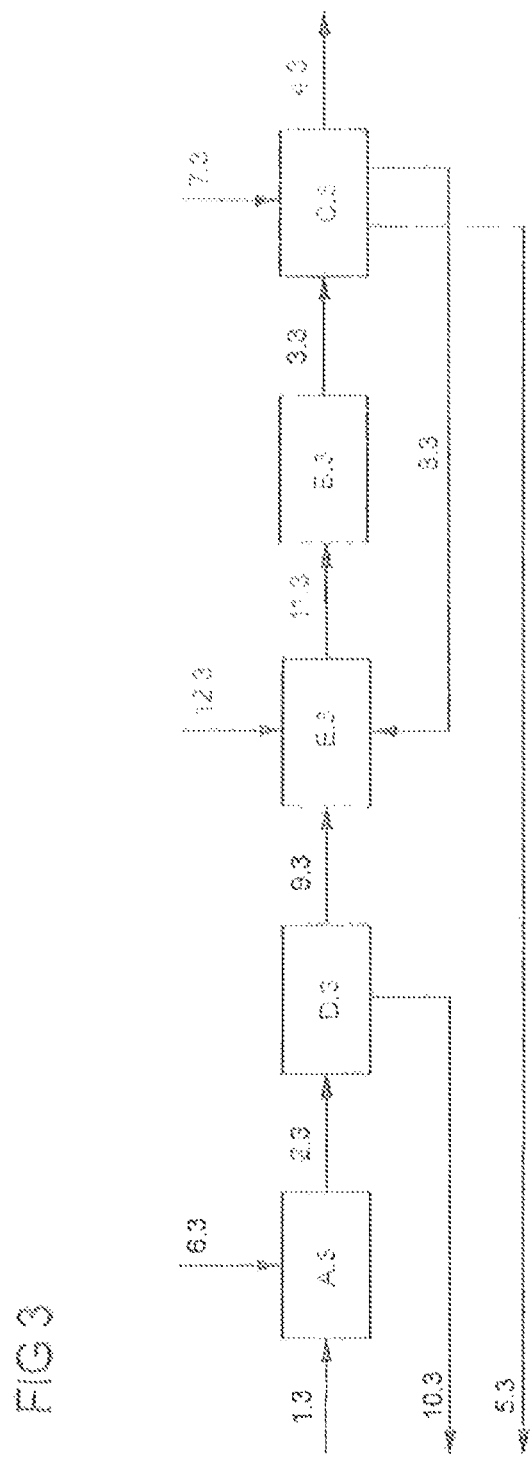
FIG. 3 illustrates an exemplary embodiment for recovering a stabilized lignin having a defined grain size distribution applied to colloidal lignin.
Figure 4:
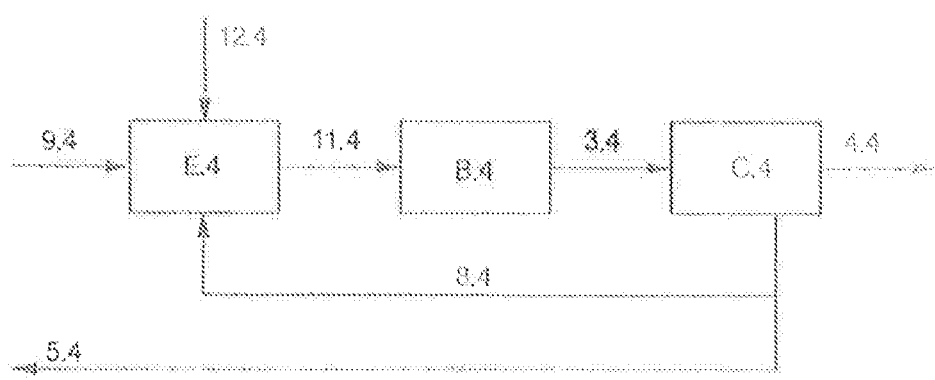
FIG. 4 illustrates an exemplary embodiment for recovering a stabilized lignin having a defined grain size distribution applied to a lignin-containing filtercake.

Exemplary Embodiment 2 (FIG. 2):

In exemplary embodiment 2 a process according to the invention for recovering a stabilized lignin having a defined particle size distribution is applied to black liquor from an alkaline fractionation process according to the KRAFT process. The process produces a colloidal carbonized lignin. The exemplary embodiment is illustrated in FIG. 2.

The black liquor (1.2) is withdrawn from the evaporation plant of the KRAFT process having a dry matter content of 30 mass % and represents the lignin-containing liquid. The pH of the black liquor is about 13. The lignin is dissolved in the black liquor.

The pH of the black liquor is initially reduced to about 11.5 by introduction of $CO_2$ (6.2) in an apparatus for pH reduction (A.2). The thus-pretreated black liquor (2.2) is hydrothermally carbonized over a duration of 3 hours and at a temperature of 250° C. in a hydrothermal carbonization (B.2). Carbonized lignin precipitates from the black liquor during the hydrothermal carbonization. The pH of the carbonized black liquor (3.2) is about 10.5 after the hydrothermal carbonization. The carbonized, precipitated lignin is separated from the carbonized black liquor through a mechanical dewatering (C.2) at a temperature of 80° C. by filtration. The thus-obtained filtrate (5.2) is recycled into the evaporation plant of the KRAFT process. The filtercake (4.2) consists of a colloidal carbonized lignin and remaining carbonized black liquor and is discharged from the process.

Figure 6:
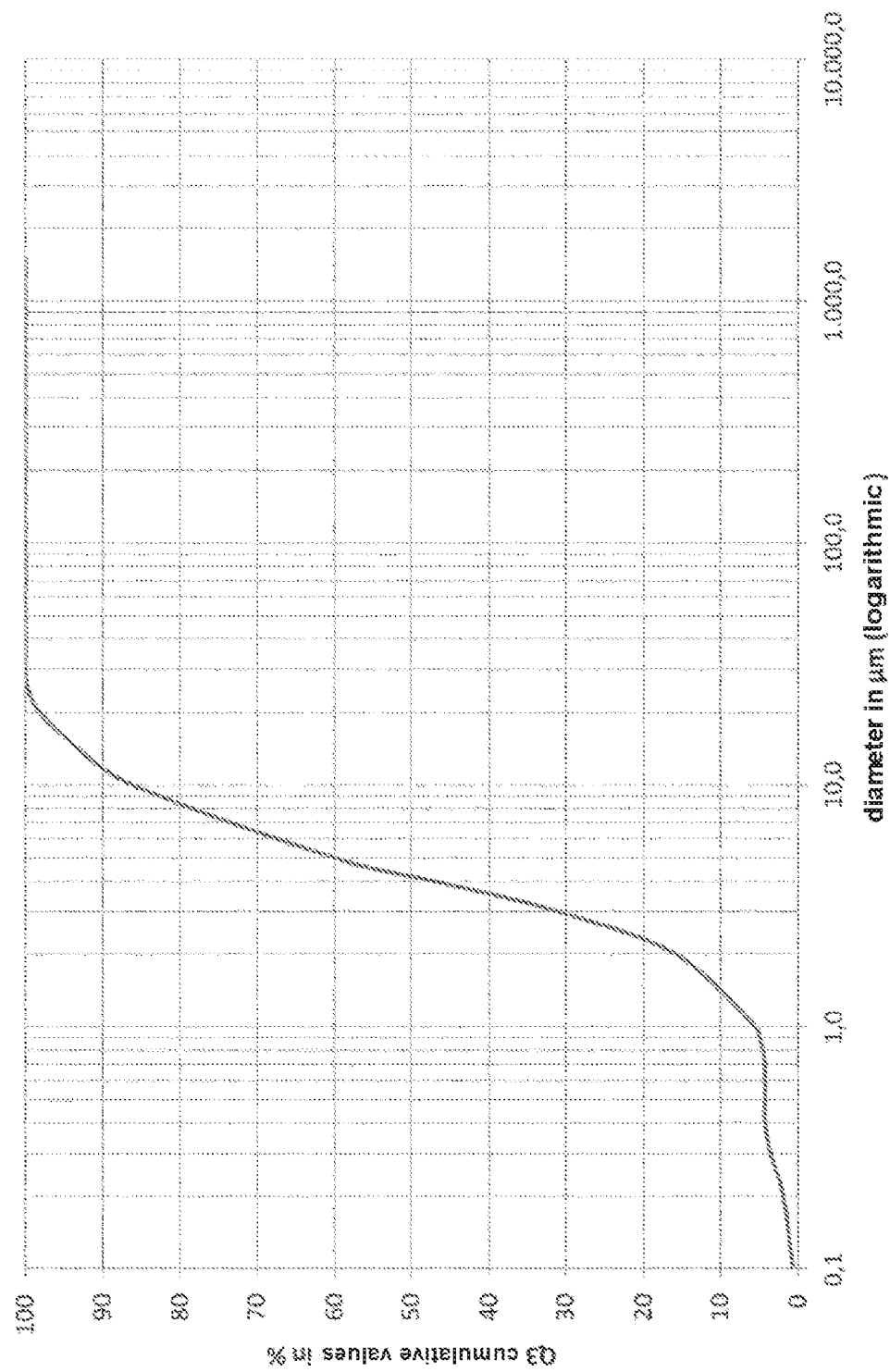

To determine the Q3 distribution of the grain size of the colloidal carbonized lignin the filtercake (4.2) diluted with distilled water was dispersed using ultrasound over a duration of 30 seconds and subjected to laser diffraction measurement with a Cilas 1190 laser granulometer instrument. The thus-determined grain size distribution of the colloidal carbonized lignin is depicted in FIG. 6 which shows the Q3 distribution of the carbonized lignin for exemplary embodiment 2. The D90 is 11.96 μm and the D50 is 4.2 μm.

Exemplary Embodiment 3a (FIG. 3):

In exemplary embodiment 3a a process according to the invention for recovering a stabilized lignin having a defined grain size distribution is applied to colloidal lignin. The lignin proportion of the colloidal lignin is greater than 90%.

The colloidal lignin is precipitated out of black liquor (1.3) withdrawn from the evaporation plant of a KRAFT process by acidification of said black liquor with $CO_2$ (6.3) in an apparatus for lowering pH (A.3). The mixture of black liquor and precipitated lignin (2.3) is then supplied to a membrane filter press (D.3) and mechanically dewatered therein. The filtrate from the membrane filter press (10.3) is recycled into the evaporation plant of the KRAFT process. The pH of the thus-obtained filtercake of colloidal lignin (9.3) is about 9, the solids content about 55%. The process according to the invention is now used to produce a fine sediment of carbonized lignin from the colloidal lignin present in the filtercake.

The filtercake of the colloidal lignin (9.3) is initially diluted with water to a solids content of about 20% in an apparatus for mixing (E.3) to obtain the lignin-containing liquid. The pH of the lignin-containing liquid is reduced to about 8 by addition of $H_2SO_4$ (12.3) into the apparatus for mixing (E.3). The thus-treated lignin-containing liquid (11.3) is hydrothermally carbonized over a duration of 3 hours and at a temperature of 230° C. in a hydrothermal carbonization (B.3). After the hydrothermal carbonization the pH of the liquid containing the carbonized lignin (3.3) is about 8.

The carbonized lignin is separated from the liquid containing the carbonized lignin through a mechanical dewatering in a membrane filter press (C.3) to obtain a filtercake. The thus-obtained filtrate (5.3) is recycled into the evaporation plant of the KRAFT process. The filtercake is then washed with water (7.3). The thus-generated washing water (8.3) is utilized for diluting the filtercake of the colloidal lignin to a solids content of about 20% before the hydrothermal carbonization. The washed filtercake (4.3) consists of a fine sediment of carbonized lignin and remaining water and is discharged from the process.

Figure 7:
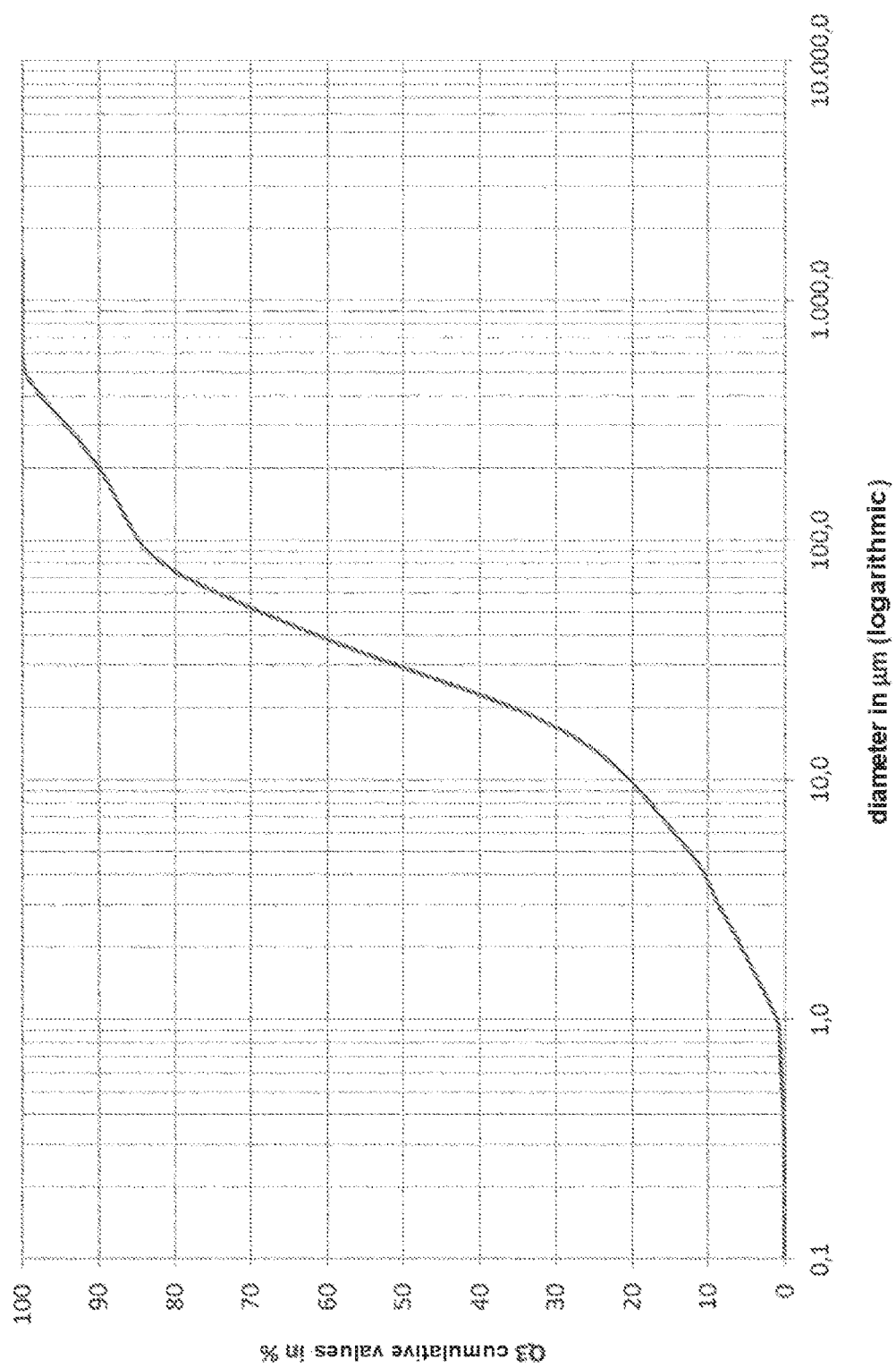

To determine the Q3 distribution of the grain size of the fine sediment of carbonized lignin the filtercake (4.3) diluted with distilled water was dispersed using ultrasound over a duration of 120 seconds and subjected to laser diffraction measurement with a Cilas 1190 laser granulometer instrument. The thus-determined grain size distribution of the fine sediment of carbonized lignin is depicted in FIG. 7 which shows the Q3 distribution of the carbonized lignin for exemplary embodiment 3a. The D90 is 197.91 μm and the D50 is 29.24 μm.

Exemplary Embodiment 3b (FIG. 3):

In exemplary embodiment 3b a process according to the invention for recovering a stabilized lignin having a defined grain size distribution is applied to colloidal lignin. The lignin proportion of the colloidal lignin is greater than 90%.

The colloidal lignin is precipitated out of black liquor (1.3) withdrawn from the evaporation plant of a KRAFT process by acidification of said black liquor with $CO_2$ (6.3) in an apparatus for lowering pH (A.3). The mixture of black liquor and precipitated lignin (2.3) is then supplied to a membrane filter press (D.3) and mechanically dewatered therein. The filtrate from the membrane filter press (10.3) is recycled into the evaporation plant of the KRAFT process. The pH of the thus-obtained filtercake of colloidal lignin (9.3) is about 9, the solids content about 55%. The process according to the invention is now used to produce a fine sediment of carbonized lignin from the colloidal lignin present in the filtercake.

The filtercake of the colloidal lignin (9.3) is initially diluted with water to a solids content of about 20% in an apparatus for mixing (E.3) to obtain the lignin-containing liquid. In contrast to exemplary embodiment 3a, in exemplary embodiment 3b the pH of the lignin-containing liquid is not changed by adding $H_2SO_4$. Stream 12.3 is accordingly zero. The thus-treated lignin-containing liquid (11.3) is hydrothermally carbonized over a duration of 3 hours and at a temperature of 230° C. in a hydrothermal carbonization (B.3). After the hydrothermal carbonization the pH of the liquid containing the carbonized lignin (3.3) is about 8.5.

The carbonized lignin is separated from the liquid containing the carbonized lignin through a mechanical dewatering in a membrane filter press (C.3) to obtain a filtercake. The thus-obtained filtrate (5.3) is recycled into the evaporation plant of the KRAFT process. The filtercake is then washed with water (7.3). The thus-generated washing water (8.3) is utilized for diluting the filtercake of the colloidal lignin to a solids content of about 20% before the hydrothermal carbonization. The washed filtercake (4.3) consists of a fine sediment of carbonized lignin and remaining water and is discharged from the process.

Figure 8:
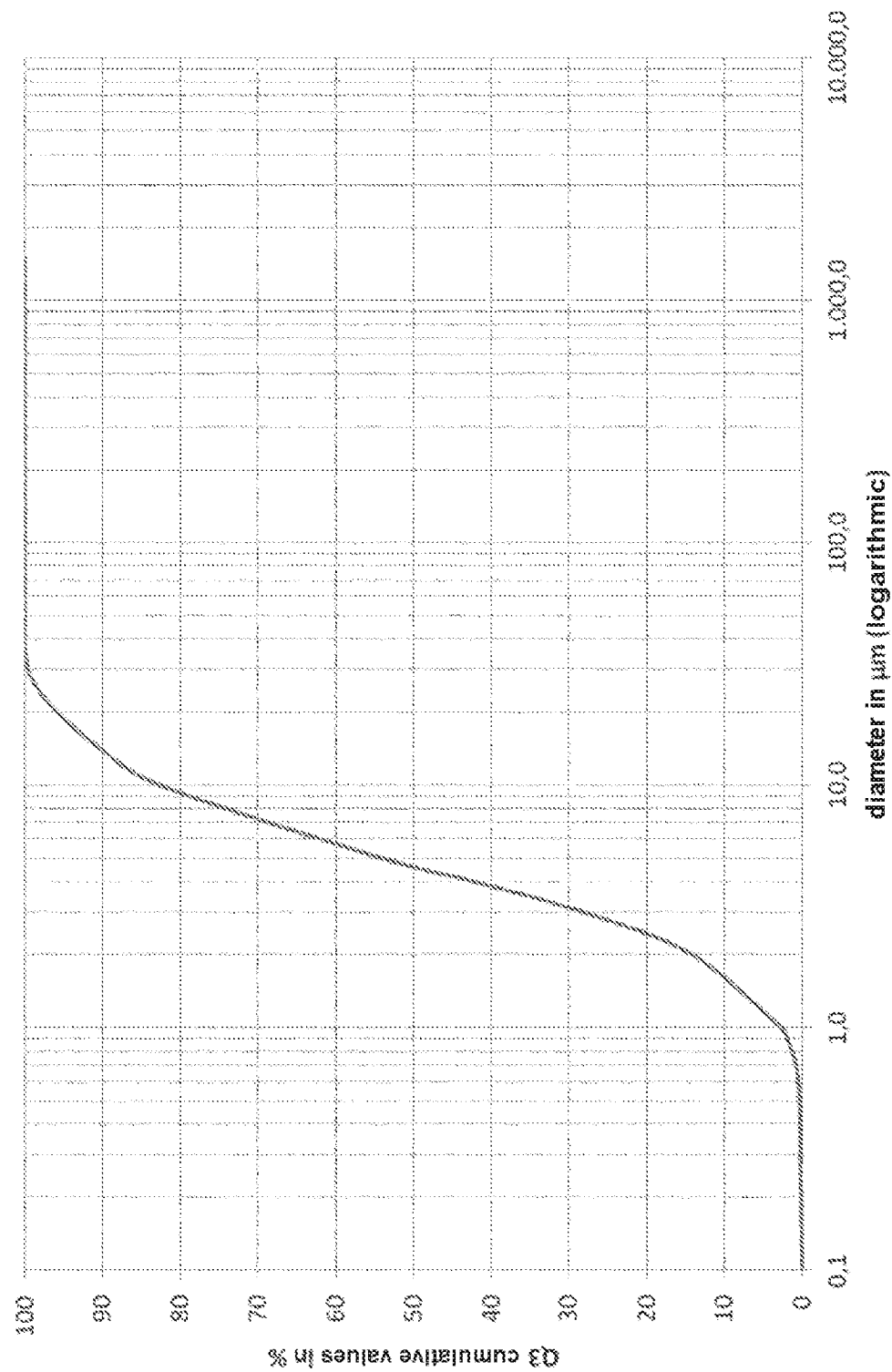

To determine the Q3 distribution of the grain size of the fine sediment of carbonized lignin the filtercake (4.3) diluted with distilled water was dispersed using ultrasound over a duration of 120 seconds and subjected to laser diffraction measurement with a Cilas 1190 laser granulometer instrument. The thus-determined grain size distribution of the fine sediment of carbonized lignin is depicted in FIG. 8 which shows the Q3 distribution of the carbonized lignin for exemplary embodiment 3b. The D90 is 13.88 μm and the D50 is 4.62 μm.

The comparison of exemplary embodiments 3a and 3b shows how an increase in the H+ ion concentration by the further addition of $H_2SO_4$ after the addition of $CO_2$ in example 3a allows the grain size distribution of the carbonized lignin to be influenced and a coarser product compared to exemplary embodiment 3b to be obtained.

Exemplary Embodiment 4a (FIG. 4):

In exemplary embodiment 4a a process according to the invention for recovering a stabilized lignin having a defined grain size distribution is applied to a lignin-containing filtercake from a hydrolysis process. The lignin proportion of the filtercake is about 70%. The process produces a fine sediment of carbonized lignin from the lignin.

The lignin-containing filtercake (9.2) is initially diluted with water to a solids content of about 20% in an apparatus for mixing (E.4) to obtain the lignin-containing liquid. The pH of the lignin-containing liquid is about 4.5. The pH is then raised to about 10 by addition of KOH (12.4). The thus-treated lignin-containing liquid (11.4) is hydrothermally carbonized over a duration of 3 hours and at a temperature of 250° C. in a hydrothermal carbonization (B.4). After the hydrothermal carbonization the pH of the liquid containing the carbonized lignin (3.4) is about 5. The carbonized lignin is separated from the liquid containing the carbonized lignin through a mechanical dewatering (C.4) in a membrane filter press.

The thus-generated filtrate is partly (8.4) utilized in E.4 for diluting the filtercake to a solids content of about 20% before the hydrothermal carbonization and partly (5.4) discharged from the process. The filtercake (4.4) consists of a fine sediment of carbonized lignin and remaining liquid and is discharged from the process.

Figure 9:
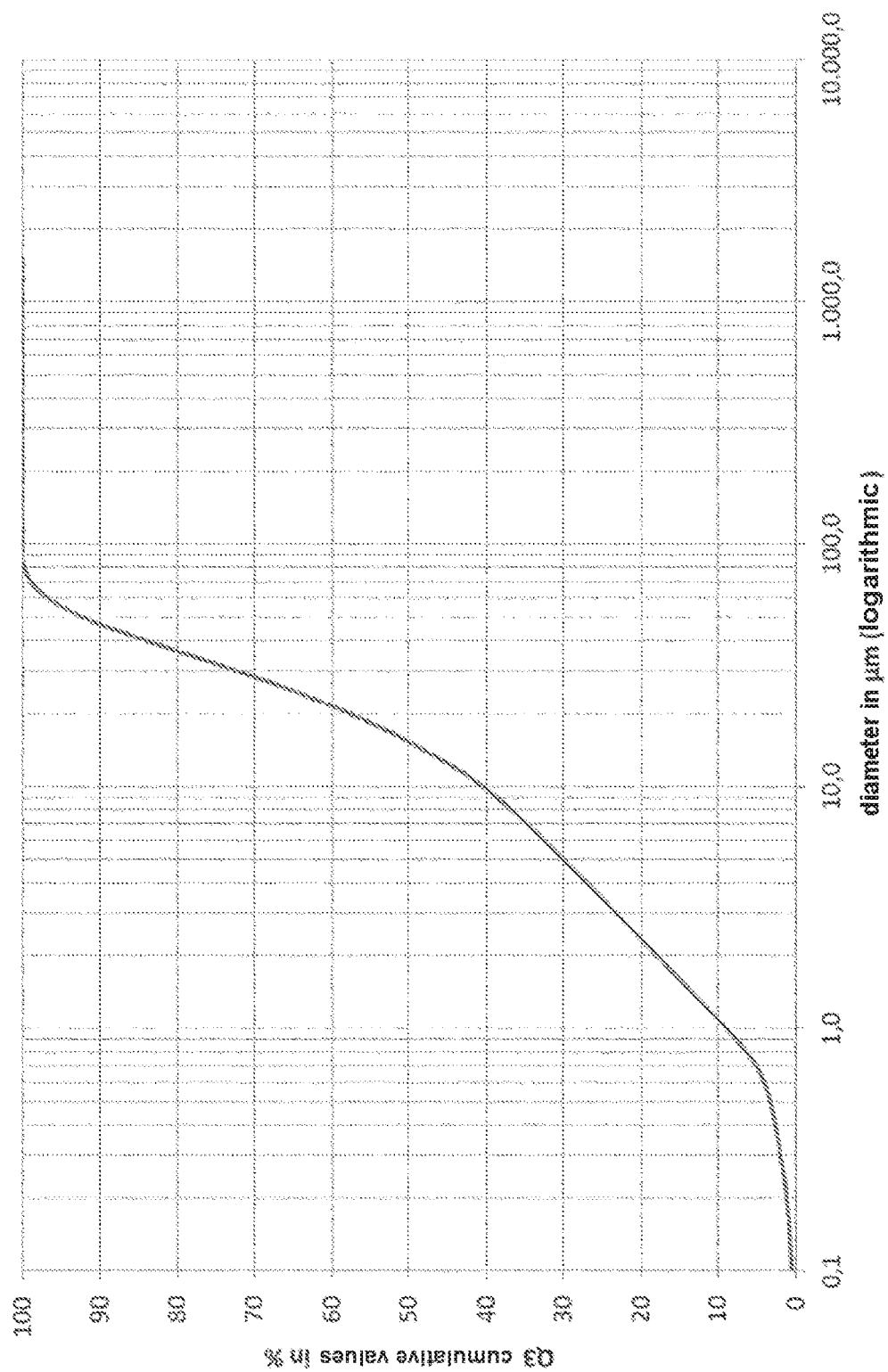

To determine the Q3 distribution of the grain size of the fine sediment of carbonized lignin the filtercake (4.4) diluted with distilled water was dispersed using ultrasound over a duration of 60 seconds and subjected to laser diffraction measurement with a Cilas 1190 laser granulometer instrument. The thus-determined grain size distribution of the fine sediment of carbonized lignin is depicted in FIG. 9 which shows the Q3 distribution of the carbonized lignin for exemplary embodiment 4a. The D90 is 46.69 μm and the D50 is 15.20 μm.

Exemplary Embodiment 4b (FIG. 4):

In exemplary embodiment 4b a process according to the invention for recovering a stabilized lignin having a defined grain size distribution is applied to a lignin-containing filtercake from a hydrolysis process. The lignin proportion of the filtercake is about 70%. The process produces a fine sediment of carbonized lignin from the lignin.

The lignin-containing filtercake (9.2) is initially diluted with water to a solids content of about 15% in an apparatus for mixing (E.4) to obtain the lignin-containing liquid. The pH of the lignin-containing liquid is about 5. In contrast to exemplary embodiment 4a the pH of the lignin-containing liquid is not changed by adding KOH. Stream 12.4 is accordingly zero. The lignin-containing liquid (11.4) is hydrothermally carbonized over a duration of 3 hours and at a temperature of 230° C. in a hydrothermal carbonization (B.4). After the hydrothermal carbonization the pH of the liquid containing the carbonized lignin (3.4) is about 4. The carbonized lignin is separated from the liquid containing the carbonized lignin through a mechanical dewatering (C.4) in a membrane filter press.

The thus-generated filtrate is partly (8.4) is utilized in E.4 for diluting the filtercake to a solids content of about 15% before the hydrothermal carbonization and partly (5.4) discharged from the process. The filtercake (4.4) consists of a fine sediment of carbonized lignin and remaining liquid and is discharged from the process.

Figure 10:
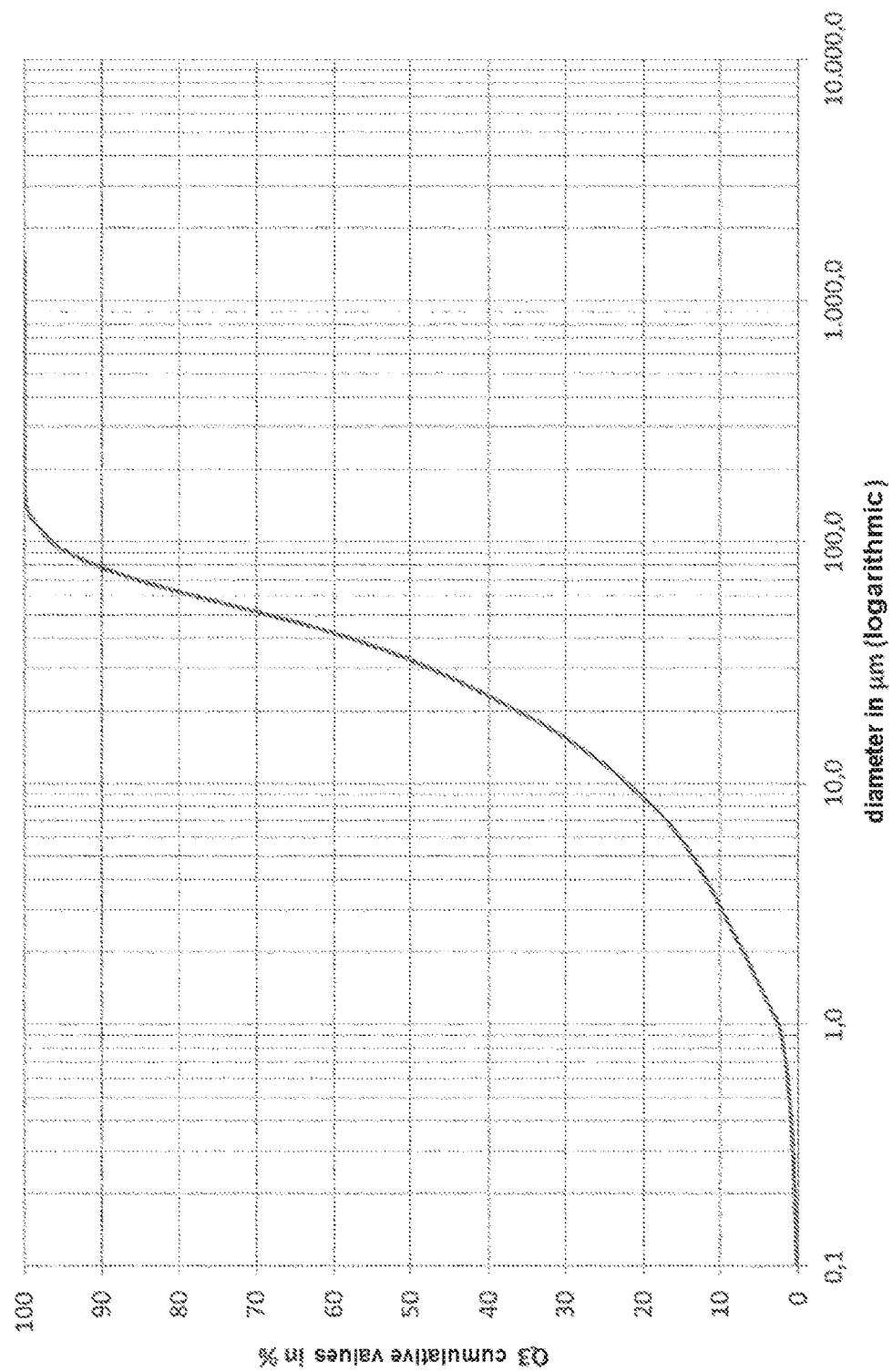

To determine the Q3 distribution of the grain size of the fine sediment of carbonized lignin the filtercake (4.4) diluted with distilled water was dispersed using ultrasound over a duration of 60 seconds and subjected to laser diffraction measurement with a Cilas 1190 laser granulometer instrument. The thus-determined grain size distribution of the fine sediment of carbonized lignin is depicted in FIG. 10 which shows the Q3 distribution of the carbonized lignin for exemplary embodiment 4b. The D90 is 77.98 μm and the D50 is 32.33 μm.

The comparison of exemplary embodiments 4a and 4b shows how a reduction in the H+ ion concentration by the further addition of KOH in example 4a allows the grain size distribution of the carbonized lignin to be influenced and a finer product compared to exemplary embodiment 4b to be obtained.

The invention claimed is:

1. A process for recovering carbonized lignin having a defined grain size distribution from a lignin-containing aqueous liquid, wherein the lignin-containing aqueous liquid is subjected to a hydrothermal carbonization to convert the lignin into a carbonized lignin, which proceeds autocatalytically, and the carbonized lignin is separated from the aqueous liquid containing the carbonized lignin, wherein:
the lignin-containing aqueous liquid is subjected to a hydrothermal carbonization at temperatures in the range from about 150° C. to about 280° C.; and
by adapting the H+ ion concentration in the lignin-containing aqueous liquid before and/or during the hydrothermal carbonization, the grain size distribution of the carbonized lignin is adjusted,
wherein the H+ ion concentration in the lignin-containing aqueous liquid is reduced before and/or during the hydrothermal carbonization for reducing the grain size distribution of the carbonized lignin by increasing the pH value, and
the H+ ion concentration in the lignin-containing aqueous liquid is increased before and/or during the hydrothermal carbonization for increasing the grain size distribution of the carbonized lignin by lowering the pH value.

2. The process as claimed in claim 1, wherein the lignin-containing aqueous liquid is subjected to the hydrothermal carbonization at temperatures in the range from 200° C. to 250° C.

3. The process as claimed in claim 1, wherein the lignin-containing aqueous liquid is subjected to the hydrothermal carbonization for the duration of not less than 1 hour and not more than 6 hours.

4. The process as claimed in claim 1, wherein:
by adapting the H+ ion concentration in the lignin-containing aqueous liquid before and/or during the hydrothermal carbonization, the grain size distribution of the carbonized lignin is adjusted such that a colloidal carbonized lignin is formed; or
by adapting the H+ ion concentration in the lignin-containing aqueous liquid before and/or during the hydrothermal carbonization the grain size distribution of the carbonized lignin is adjusted such that a fine sediment of carbonized lignin is formed; or
by adapting the H+ ion concentration in the lignin-containing aqueous liquid before and/or during the hydrothermal carbonization, the grain size distribution of the carbonized lignin is adjusted such that a coarse sediment of carbonized lignin is formed.

5. The process as claimed in claim 4, wherein:
for formation of colloidal carbonized lignin the H+ ion concentration is adapted such that the pH of the lignin-containing aqueous liquid before and during the hydrothermal carbonization does not fall below 10,
for formation of a fine sediment of carbonized lignin, the H+ ion concentration is adapted such that the pH of the lignin-containing aqueous liquid before and during the hydrothermal carbonization is >7, or
for formation of a coarse sediment of carbonized lignin, the H+ ion concentration is adapted such that the pH of the lignin-containing aqueous liquid before and during the hydrothermal carbonization is <9.

6. The process as claimed in claim 5, wherein:
for formation of a fine sediment of carbonized lignin, the H+ ion concentration is adapted such that the pH of the lignin-containing aqueous liquid before the hydrothermal carbonization is >7 and during the hydrothermal carbonization is between 7 and 11, or
for formation of a coarse sediment of carbonized lignin, the H+ ion concentration is adapted such that the pH of the lignin-containing aqueous liquid before the hydrothermal carbonization is <9, and during the hydrothermal carbonization is <8.

7. The process as claimed in claim 6, wherein for formation of a fine sediment of carbonized lignin, the H+ ion concentration is adapted such that the pH of the lignin-containing aqueous liquid before the hydrothermal carbonization is >8 and/or during the hydrothermal carbonization is between 8 and 10.

8. The process as claimed in claim 5, wherein for formation of a fine sediment of carbonized lignin, the H+ ion concentration is adapted such that the D90 of the fine sediment of carbonized lignin is <100 µm or <100 µm.

9. The process as claimed in claim 8, wherein for formation of a fine sediment of carbonized lignin, the H+ ion concentration is adapted such that the D90 of the fine sediment of carbonized lignin is ≤50 µm or <50 µm.

10. The process as claimed in claim 1, wherein the lignin before the hydrothermal carbonization is dissolved in the lignin-containing aqueous liquid to an extent of greater than 50%.

11. The process as claimed in claim 10, wherein the pH of the lignin-containing aqueous liquid before the hydrothermal carbonization is adjusted such that the lignin before the hydrothermal carbonization is dissolved in the lignin-containing liquid to an extent of greater than 50%.

12. The process as claimed in claim 1, wherein to increase the H+ ion concentration in the lignin-containing aqueous liquid, an acid which is a reaction participant during the hydrothermal carbonization is employed, or to reduce the H+ ion concentration in the lignin-containing aqueous liquid, a base which binds H+ ions is employed.

13. The process as claimed in claim 1, wherein $CO_2$ is used for adapting the H+ ion concentration.

14. The process as claimed in claim 1, wherein $H_2S$ is used for adapting the H+ ion concentration.

15. The process as claimed in claim 1, wherein the H+ ion concentration is increased by increasing the proportion of biomass, cellulose, hemicellulose and/or decomposition products thereof in the lignin-containing aqueous liquid before and/or during the hydrothermal carbonization.

16. The process as claimed in claim 1, wherein the grain size distribution of the carbonized lignin is measured continuously or at regular intervals and in the case of a deviation of the grain size distribution in excess of a defined tolerance an adaptation of the H+ ion concentration in the lignin-containing aqueous liquid is effected.

17. The process as claimed in claim 1, wherein the process is applied to:
black liquor from an alkaline fractionation process: or
a lignin-containing liquid recovered by dilution of a lignin-containing filtercake, by dilution of a filtercake containing a lignin precipitated from black liquor or by dilution of a filtercake containing the lignin-containing residue from a hydrolysis.

18. The process as claimed in claim 1, wherein:
lignin is precipitated from a first lignin-containing liquid,
the precipitated lignin is separated from the first lignin-containing liquid,
the precipitated and separated lignin is suspended in a liquid to obtain a second lignin-containing liquid, and
the second lignin-containing liquid is subjected to the hydrothermal carbonization.

19. The process as claimed in claim 18, wherein the precipitated and separated lignin is partly or fully dissolved in the liquid.

20. The process as claimed in claim 1, wherein the lignin is precipitated from the lignin-containing aqueous liquid upon conversion into carbonized lignin during the hydrothermal carbonization.

21. The process as claimed in claim 1, wherein the lignin precipitates or is precipitated from the lignin-containing aqueous liquid at least partly upon conversion into carbonized lignin during the hydrothermal carbonization.

22. The process as claimed in claim 1, wherein the carbonized lignin is separated from the liquid containing the carbonized lignin by a mechanical dewatering.

23. The process as claimed in claim 1, wherein lignin separated from the liquid containing carbonized lignin is washed.

* * * * *